Aug. 12, 1969  L. O. HEFLINGER  3,460,881
IMAGE STABILIZER
Filed Feb. 13, 1967  3 Sheets-Sheet 1
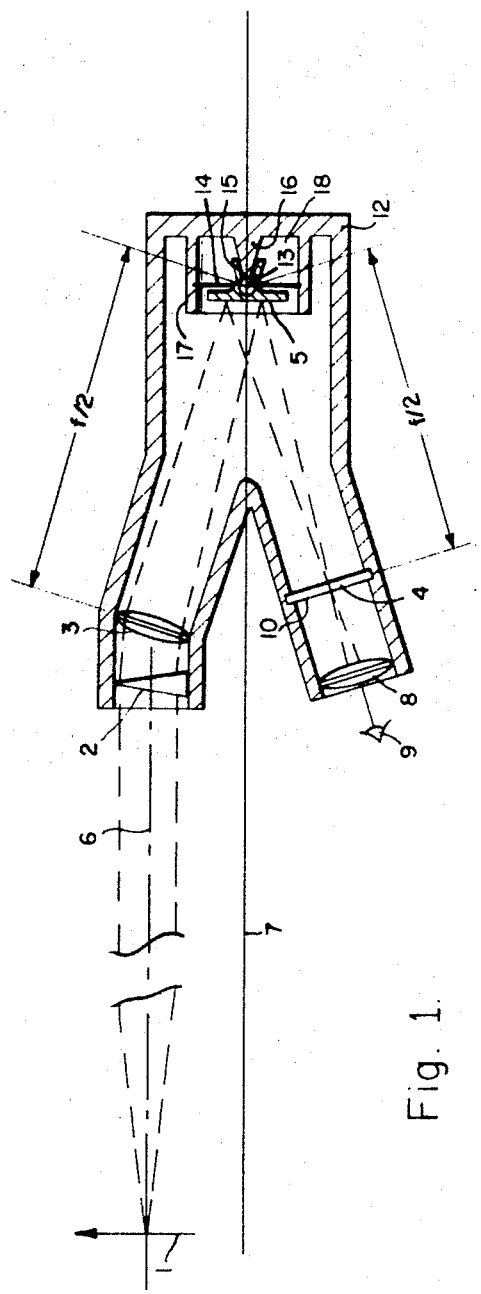
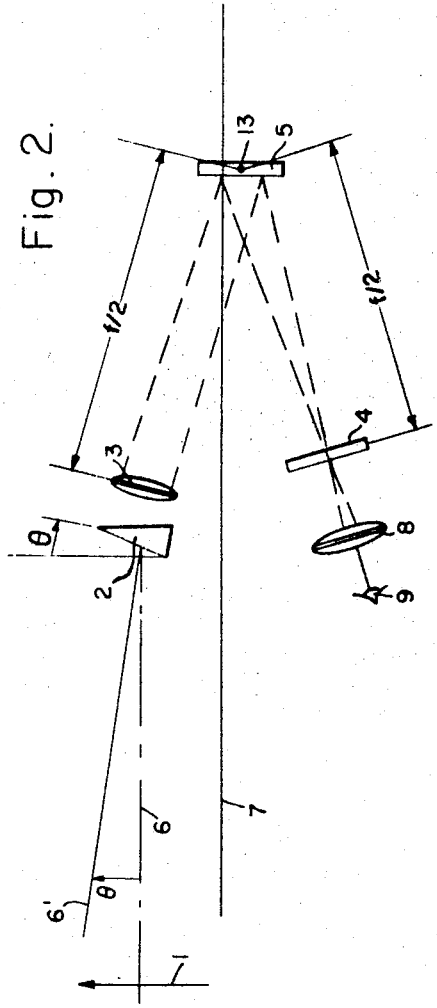
Lee O. Heflinger,
INVENTOR.
BY
Edward Dugas
AGENT.

Lee O. Heflinger,
INVENTOR.
BY.
Edward Dugas
AGENT.

Aug. 12, 1969    L. O. HEFLINGER    3,460,881
IMAGE STABILIZER

Filed Feb. 13, 1967    3 Sheets-Sheet 3

Lee O. Heflinger,
INVENTOR.
BY
Edward Dugas
AGENT.

United States Patent Office 3,460,881
Patented Aug. 12, 1969

3,460,881
IMAGE STABILIZER
Lee O. Heflinger, Torrance, Calif., assignor to TRW Inc., Redondo Beach, Calif., a corporation of Ohio
Filed Feb. 13, 1967, Ser. No. 615,626
Int. Cl. G02b 23/00, 17/00, 23/02
U.S. Cl. 350—16                               3 Claims

ABSTRACT OF THE DISCLOSURE

This invention pertains to an apparatus for stabilizing the image of an optical system. In the apparatus, a mirror is inertially stabilized and displaced from the incoming line of sight with the reflective surface of the mirror perpendicular to the incoming line of sight. An optical deflector deflects the incoming rays to an objective lens which is positioned approximately one-half its focal length in front of the mirror. The objective lens directs the incoming rays to the mirror where they are reflected at an angle to an eyepiece which is also positioned approximately one-half focal length in front of the mirror.

BACKGROUND OF THE INVENTION

This invention provides an apparatus for stabilizing the image of a wide variety of optical systems wherein unwanted system vibrations or motion occurs, such as vibration from the normal hand tremor of a person holding a telescope or binoculars or the vibration transmitted from tanks, aircrafts, ships, weapons and the like, to the gunsights and other optical systems mounted thereon. In unstabilized optical systems, such vibration causes the image viewed or photographed to blur.

The human eye, for example, can follow vibrations of an image only to about one cycle per second, assuming that the amplitude of the vibration is small. Because the higher optical system magnifications magnify the apparent degrees of travel of the apparent image, the magnification of many optical systems is limited strictly by the increase in blurring and image motion stabilization properties which attend the magnification. The prior art contains a number of ideas for image stabilization, such as rigidly mounting the entire optical system frame to a tripod or to stabilization gyros or correcting by electronic image shifting, using either optical feedback or inertial sensing to provide corrective signals. In the television industry, the "Dynalens" has been used. The Dynalens, however, requires two gyros and two servos, one set to move each transparent end plate in order to vary the geometry of the liquid lens.

SUMMARY OF THE INVENTION

This invention is based upon the recognition that for the best image stabilization, the stabilized mirror should be located at one-half the focal length of the system and that the reflective surface of the mirror should be perpendicular to the incoming optical rays (line of sight).

It is therefore an object of the present invention to provide a new and novel optical stabilizer.

It is another object of the present invention to provide an optical system wherein the effects of certain vibrations about the optical axis are substantially reduced or eliminated.

In a preferred form of the present invention, the foregoing objects are achieved by placing the inertially stabilized mirror with its reflective surface perpendicular to the viewing axis of the system, but not coincident with the viewing axis. An optical element is placed along the viewing axis one-half the focal length from a stabilized reflector for converging and deflecting the incoming light rays at an angle onto the reflecting surface of the stabilized reflector and means are provided for viewing the converging light rays that are deflected from the reflector.

The aforementioned and other objects of the present invention will become more apparent when taken in conjunction with the following description and drawings in which like numbers designate like parts.

BRIEF DESCRIPTION OF THE DRAWINGS

FIGURE 1 is a side elevation in cutaway of a preferred optical system according to this invention;

FIGURE 2 is a schematic diagram illustrating the operation of the optical system of FIGURE 1;

Referring to FIGURE 1, in the optical system shown therein, light from an object or scene 1 passes through an optical element which is comprised of a prism 2 which reflects the light rays, and an objective lens 3 which gathers the deflected light rays and converges them to form an image at the reticle 4, passing on the way to a stable reflector (mirror) 5 which is positioned with its reflective surface maintained substantially perpendicular to the viewing axis 6, but displaced therefrom along the parallel axis 7. From the image 4 the light diverges to the eyepiece lens 8 which collimates the light and redirects it into the pupil of the observer's eye 9. The entire apparatus is rigidly assembled in the support member (housing) 12, except for the stabilization mirror 5 which is flexibly mounted with at least two angular degrees of freedom by the pivot 13 to the housing 12.

Figure 3:
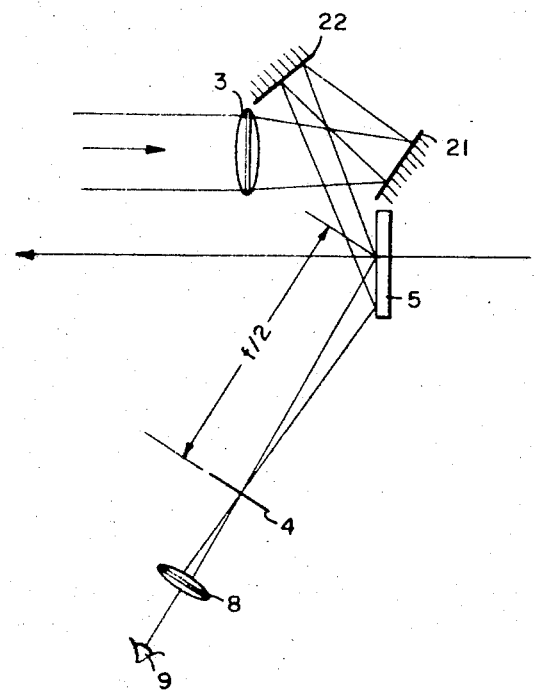
FIGURE 3 is a schematic diagram of a second embodiment of this invention.

The arrangement of the components is such that the distance from the rear nodal point of the objective lens 3 to the center of the mirror 5 is exactly, or closely, equal to one-half the conjugate focal length ($f$) of the objective lens 3 times the factor $(1+1/m)$, where $m$ is the magnification of the telescope systems as a whole. For camera optics, the stabilization mirror is mounted at one-half ($f$) without the $(1+1/m)$ corrective factor. This gives image stabilization relative to the support member of the optical system rather than relative to an absolute or inertial reference system, since the camera is also affixed to the support member.

The stabilization mirror 5 is mounted on the pivot 13 so that its center of gravity substantially coincides with the center of angular deflection of the pivot. The properties of this pivoting mirror assembly should be such as to cause it to maintain its orientation in space insofar as sudden jitter and angular vibration are concerned. A cylindrical column 17 fixedly attached to the housing 12 can be used to so provide a support for a flexible spring diaphragm 14, which is connected about the inner periphery of the cylindrical wall member 17 on one edge, and to the mirror around the central portion. Dampings may be provided by shaping the pivotal support as a cone section 16, about which a second recessed cone member 15, which is fixedly attached to the mirror assembly, rotates. The air or liquid which is located in the cavity 18 provides the damping action between the two cone sections. Alternatively, a small motor and flywheel (gyro) attached to the mirror will provide a better stabilization of the mirror. The specific technique of the stabilization of the mirror is not essential to this invention. It is only necessary to isolate the mirror from high frequency angular motions such that angular deflections and rates of the mirror are a fraction of the angular deflection of the supporting members.

Referring now to FIGURE 2, wherein is illustrated the case where the optical system is deflected a small angle, the optical axis 6′ will now point at an angle θ to the viewing axis 6. However, the stable mirror 5 retains its original orientation normal to the viewing axis. With the mirror continually perpendicular to the line of sight, the image remains stationary at 9 while the optical rays move up on the surface of the mirror 5. It the optic axis 6′ were rotated downward below the viewing axis 6, then the rays would move down on the mirror. Corresponding motions will occur for displacements in the other angular directions.

FIGURE 3 shows an additional embodiment of an optical system according to the present invention. In the arrangement, a mirror 21 is placed in the optical path of the objective lens 3 at an angle so as to reflect the incoming rays back toward the objective lens 3 at an angle. Another mirror 22 is placed facing mirror 21 at an angle which deflects the incoming rays onto the inertially stabilized mirror 5 and thereto to the reticle and the objective lens. The eyepiece 8 receives the image from the reticle and collimates the light so that it may be viewed by the eye of the observer 9. In this particular embodiment, the prism is eliminated, thereby creating an inherently cheaper and simpler instrument which still embodies the image stabilization properties of the embodiment shown in FIGURES 1 and 2.

Figure 4:
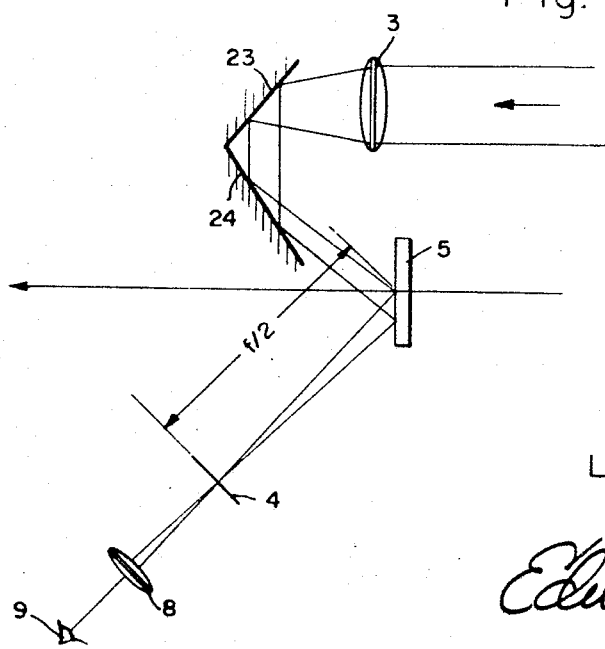
FIGURE 4 is a schematic diagram of a third embodiment of this invention.

FIGURE 4 illustrates a third embodiment of an optical system according to the present invention. Light from an image is received at the objective lens 3 and converged onto a mirror 23 which is positioned in the optical path at an angle so as to deflect the beam onto another mirror 24. Mirror 24 is positioned at an angle so as to deflect the converging rays onto the inertially stabilized mirror 5. Mirror 5 is positioned with its reflective surface perpendicular to the incoming image rays with the reflective surface facing opposite the source of the image rays. The stabilized mirror 5 deflects the converging beam onto a reticle 4 which is positioned substantially one-half the focal length of the optical system from the stabilized mirror 5. The image formed on the reticle is collimated by the eyepiece 8 and transmitted to the pupil 9 of the observer. The operation of this embodiment is substantially similar to the operation of the embodiment of FIGURE 1.

Figure 5:
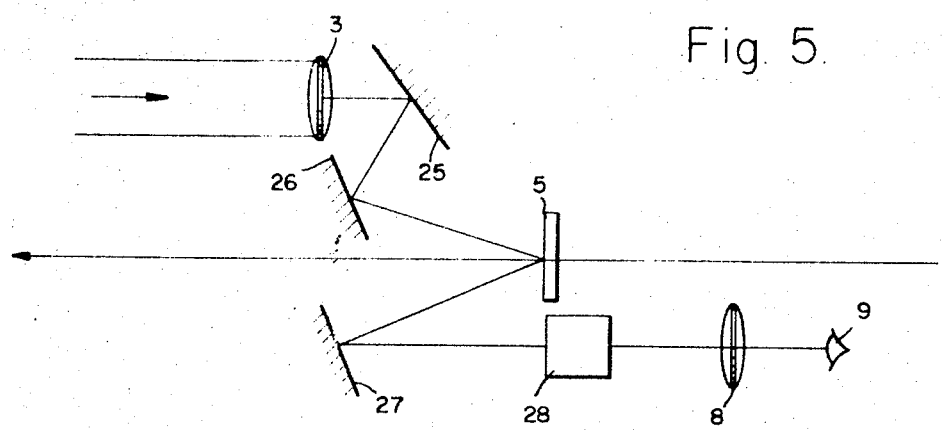
FIGURE 5 is a schematic digram of a fourth embodiment of this invention.

FIGURE 5 shows an additional embodiment of an optical stabilizer according to the present invention. In this arrangement, the objective lens 3 receives the optical image and directs it to the fixed mirror 25 which is positioned at an angle so as to reflect the image back towards the objective lens at an angle to the reflective surface of the fixed mirror 26. Mirror 26 is positioned at an angle so as to reflect the image onto the reflective surface of the inertially stabilized mirror 5. The stabilized mirror 5 is positioned with its reflective surface perpendicular to the viewing axis of the system. Mirror 5 reflects the image to a fixed mirror 27, which in turn redirects the image along a path substantially parallel but displaced from the viewing axis of the system. An image erector 28 which may be a prism, inverts the image such that it corresponds to the original image and directs the light rays toward the eyepiece 8 which collimates the rays and directs them towards the pupil 9 of the observer's eye.

Figure 6:
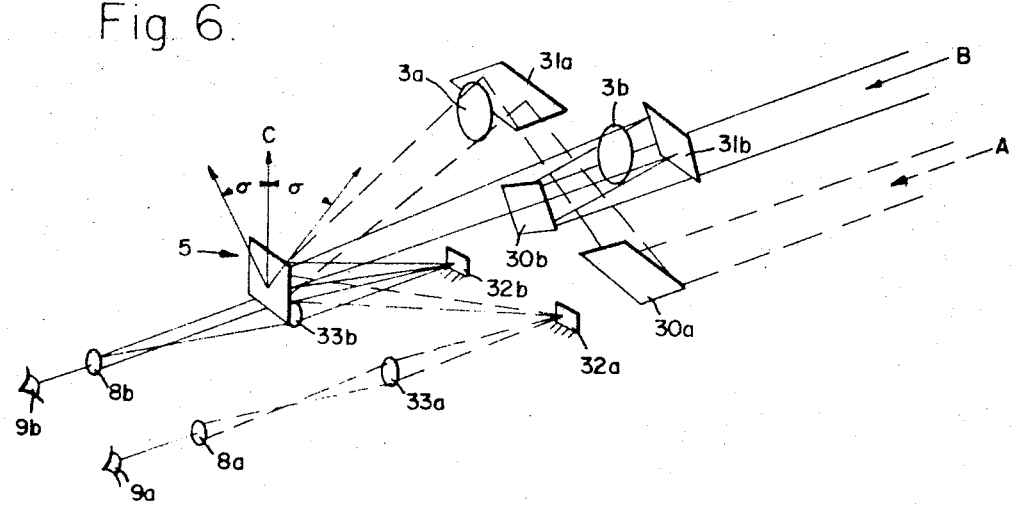
FIGURE 6 is an orthographic projection in schematic form of a binocular embodiment of this invention.

Referring now to FIGURE 6 wherein there is shown a binocular embodiment utilizing the stabilizing device of the present invention. Light from an image is received by mirrors 30a and 30b along two substantially perpendicular paths A and B, respectively.

Mirrors 30a and 30b are fixed to a support member at substantially identical angles such that light rays reflected from mirrors 30a and 30b cross each other on their way to mirrors 31a and 31b, respectively. Mirrors 31a and 31b are fixed to the same support member at an angle to direct reflected incoming rays through the converging objective lenses 3a and 3b, respectively, to the stabilized mirror 5. The stabilized mirror has its reflecting surface maintained substantially perpendicular to the viewing axis of the system by stabilizing means which is not shown for purposes of clarity. The stabilized mirror 5 is positioned substantially one-half the focal length of the objective lenses 3a and 3b from those lenses.

Mirrors 32a and 32b receive the reflected image rays from the stabilized mirror corresponding to the rays from objective lenses 3a and 3b, respectively, and reflect these rays to the erecting lenses 33a and 33b, respectively. The rays from lenses 33a and 33b are then directed to the eyepieces 8a and 8b, respectively, and from there to the viewer's pupils 9a and 9b. In operation, the binocular device is similar to the preceding embodiments. The stabilized mirror 5 is located at substantially one-half the focal length of the objective lens, between the objective lenses and the eyepieces, with its reflective surface perpendicular to the viewing axis of the system.

The angle σ which is the angle between the projections of the objective onto the mirror plane 5 and the mid-plane C of the instrument should, for optimum results, be an angle between 30° and 90°.

The main advantage of this embodiment is the use of a single stabilized mirror for both objective lenses. If two stabilized mirrors are used, difficulties are encountered in providing the same degree of correction to each mirror.

In summary, the improvement of this invention involves placing a stabilized mirror in an optical device at one-half the focal length of the system and also placing the reflective surface of the stabilized mirror perpendicular to the axis of the incoming rays. With this particular configuration, a heretofore unattainable degree of image stabilization is achieved.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. An image stabilizer for a binocular instrument comprising:
    (a) a support member;
    (b) a single reflector pivotally mounted with at least two degrees of freedom on said support member between first and second pairs of optical means remote from said reflector;
    (c) diaphragm means for stabilizing said reflector with respect to said support member, thereby to isolate said reflector from the influence of perturbations of said support member and maintain the reflective surface of said reflector substantially perpendicular to the viewing direction toward a scene to be viewed;
    (d) said first pair of optical means including each an objective fixed to said support member for simultaneously receiving an image from said viewing direction and for deflecting and converging each of said images onto said reflector; and
    (e) said second pair of optical means, each including an eyepiece lens fixed to said support member for receiving the image of the scene reflected from said reflector and permitting each pupil of the viewer to view a separate image.

2. An image stabilizer as defined in claim 1 wherein each of said first pair of optical means includes two separate fixed mirrors and an objective for reflecting two spaced images onto said reflector, said reflector being spaced from said objectives substantially one-half the focal length of each of said objectives.

3. An image stabilizer as defined in claim 1 wherein each of said second pair of optical means includes an additional fixed mirror for reflecting each of said images onto its associate eyepiece lens.

References Cited

UNITED STATES PATENTS

| | | | |
|---|---|---|---|
| 2,527,719 | 10/1950 | Greenstein et al. | 350—33 |
| 2,625,853 | 1/1953 | Hayward. | |
| 2,829,557 | 4/1958 | Jensen | 350—16 |
| 3,162,715 | 12/1964 | Scidmore | 350—36 |
| 1,143,667 | 6/1915 | Von Rohr | 350—54 |
| 1,552,449 | 9/1925 | Roach | 350—50X |
| 1,639,229 | 8/1927 | Luckey. | |
| 2,741,940 | 4/1956 | Drodofsky | 350—50X |
| 2,939,363 | 6/1960 | Kaestner | 350—51X |
| 2,944,783 | 7/1960 | Macleish et al. | 350—16X |
| 2,981,141 | 4/1961 | Armstrong et al. | 350—50X |

FOREIGN PATENTS 1,015,916   1/1966   Great Britain.

DAVID SCHONBERG, Primary Examiner

P. R. GILLIAM, Assistant Examiner

U.S. Cl. X.R.

350—50